L. SAUSSARD.
VALVE MECHANISM.
APPLICATION FILED FEB. 1, 1909.

1,007,609.

Patented Oct. 31, 1911.

Witnesses.
E. O. Crocker
C. H. Griesbauer

Inventor
Louis Saussard,
by H. B. Wilson & Co.
Attorneys.

UNITED STATES PATENT OFFICE.

LOUIS SAUSSARD, OF PARIS, FRANCE.

VALVE MECHANISM.

1,007,609.  Specification of Letters Patent. Patented Oct. 31, 1911.

Application filed February 1, 1909. Serial No. 475,466.

*To all whom it may concern:*

Be it known that I, LOUIS SAUSSARD, a citizen of the Republic of France, residing at 126 Avenue de Versailles, Paris, in the Republic of France, engineer, have invented certain new and useful Improvements in Valve Mechanisms, of which the following is a specification.

This invention relates to a system of valves for the admission and the escapement of the gases in explosion engines.

This system comprises two valves mounted on one and the same rod and combined with a fixed seat and a movable seat forming a cylindrical slide-valve. These members may be located concentrically to the explosion chamber, so that an inner space of regular shape is provided in the latter and which is advantageous both as to the manufacture and to the proper combustion of the gases. The explosion chamber is, furthermore, rendered more securely gas-tight with such a system of valves than with the usual systems, for only one of the valves is in direct communication with the explosion chamber. Again, the two valves and the slide can be operated by means of a single spring, which very much simplifies the construction and leaves a much clearer field.

Figure 1:
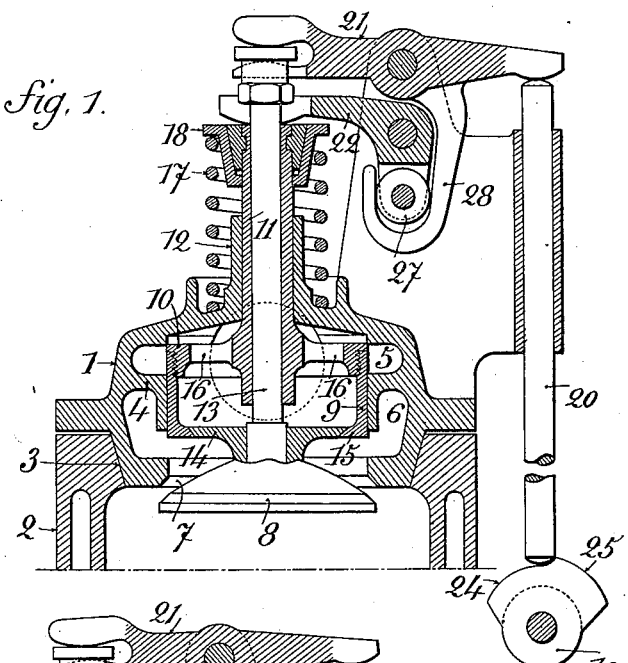
Figure 2:
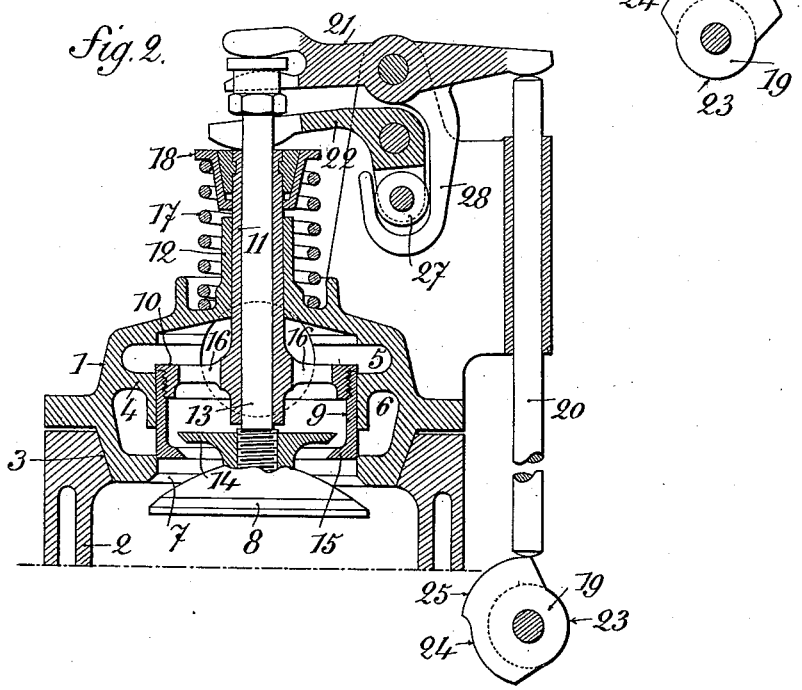

Figures 1 and 2 are similar vertical sections showing the valve mechanism in two different positions.

The breech 1, which is adjusted on the cylinder 2 by means of a conical bearing part 3, is hollow and divided by a partition 4 into two superposed chambers, the one 5 of which communicates with the carbureter of the engine and the other 6 with the escapement. The lower wall of the breech is provided with a concentric opening 7 and forms a seat for a valve 8 opening toward the interior of the cylinder.

The partition 4 is provided with an opening of the same diameter as the opening 7 and in which is a slidable hollow cylindrical slide 9, the lower part of which can be engaged in the said opening 7 so as to isolate the chamber 6 from the cylinder 1 (see Fig. 2). The top 10 of the slide 9 carries a socket 11 placed axially and slidable in the collar 12 of the breech. Within the said socket is a slidable rod 13 which carries the valve 8 and also another valve 14 for the combustible gases. The said valve 14 is located within the slide 9 and can be seated on a seat 15 formed in the base of the latter; when it is raised from its seat the combustible gases, coming into the chamber 5 and passing through the openings 16 provided in the top 10 of the slide 9, are enabled to penetrate into the cylinder 2 (see Fig. 2). The spiral spring 17, interposed between the breech 1 and a ring 18 secured to the socket 11, tends to raise the slide 9, so that the seat 15 carries the valve 14 upward as well as the valve 8 which co-acts with the same, the latter thus being brought onto its respective seat. Both valves are controlled by a single cam 19 mounted on the distributing shaft, through the medium of a slidable rod 20, of a lever 21 actuated by the said rod and acting on the rod 13, and of a lever 22 actuated by the lever 21 and acting on the socket 11.

The operation of these members is as follows: During both the compression and the relief strokes, the rod 20 rests on the part 23 of the cam 19 having the smallest radius. The levers 21 and 22 are raised at that moment and the valves 8 and 14 are held closed by the action of the spring 17. At the beginning of the escapement stroke, the rod 20 is lifted by the part 24 of the cam 19, so that the levers 21 and 22 are lowered as shown by Fig. 1. The valves 8 and 14 are thus lowered by the lever 21, without the lever 22 bearing on the socket 11; the slide 9 is at the same time carried along by the valve 14 and the explosion chamber remains isolated from the compartment 5, while the burned gases are enabled to escape through the compartment 6. At the beginning of the admission stroke, the highest part 25 of the cam 19 causes the levers 21 and 22 to swing to a greater extent, so that the valves 8 and 14 and the slide 9 are again lowered together; the lever 22, swinging at an angular speed greater than that of the lever 21 which carries it along, catches the socket 11 and bears upon the same, thus causing the slide 9 to move down more quickly than the valve 14, and at the same time the lower part of the slide 9 becomes engaged in the opening 7 and isolates the explosion chamber from the escapement conduit (see Fig. 2). The explosion chamber, thus put in communication with the compartment 5, becomes filled with fresh gases until the rod 20 again falls onto the lower part 23 of the cam 19, whereupon the slide 9 and the valves rise under the action of the spring 17, the period of compression begins, and so on. In the embodiment shown and described, the levers 21 and 22 are connected together by means of a roller 27 mounted on the lever 22 and engaged in a bifurcation 28 of the lever 21.

Although the system described comprises a single cam and a single spring to control both valves and the movable seat, there may be used, while retaining the essential arrangements of the said members, two distinct cams and two distinct springs to actuate the same.

Claims—

1. In a valve mechanism for gas motors, the combination with a valve box having a central aperture or opening and a valve seat at the outer edge of the said opening, of a partition dividing the said box into supply and escapement compartments, the said partition having central openings, an annular slide valve sliding in the said openings of the box and of its partition, the said valve having within it a valve seat, a valve within the slide valve, and a valve at the outside of the box, the two said valves being associated with one another.

2. In a valve mechanism for gas motors, the combination with a box, of an annular slide valve sliding in the said box and having within it a valve seat, a valve within the slide valve, these two valves being associated with one another, and a spring to raise the slide valve, the said valves being carried upwardly by the seat within the slide valve under the action of said spring.

3. In a valve mechanism for gas motors, the combination with a box, of an annular slide valve sliding in the said box and having within it a valve seat, a valve within the said slide valve, a valve at the outside of the box, these valves being associated with one another, a spring bearing on the box and raising the slide valve, the said valves being lifted by the seat of the slide valve under the action of the said spring, and a controlling lever to lower the slide valve with respect to the valves against the action of the said spring.

4. A valve mechanism for gas motors, comprising the combination with a box, of an annular slide valve, a valve within the slide valve, a valve at the outside of the box, these two valves being associated with one another, a spring bearing on the box and lifting the slide valve, a controlling lever positively connected with the valves, means to actuate the said lever, and a controlling lever positively connected with the first named lever and adapted to lower the slide valve with respect to the valves against the action of the said spring.

In testimony, that I claim the foregoing as my invention, I have signed my name in presence of two subscribing witnesses.

LOUIS SAUSSARD.

Witnesses:
 H. C. COXE,
 MAURICE RAUX.

---

Copies of this patent may be obtained for five cents each, by addressing the "Commissioner of Patents, Washington, D. C."